(12) United States Patent
Pi Farias et al.

(10) Patent No.: US 12,217,266 B2
(45) Date of Patent: *Feb. 4, 2025

(54) ANTIFRAUD RESILIENT TRANSACTION IDENTIFIER DATASTRUCTURE APPARATUSES, METHODS AND SYSTEMS

(71) Applicant: Idid Tecnologia LTDA, Sao Paulo (BR)

(72) Inventors: Alexandre Soares Pi Farias, Rio de Janeiro (BR); Luiz Carlos Guedes, Rio de Janeiro (BR)

(73) Assignee: IDID TECNOLOGIA LTDA, Sao Paulo (BR)

(*) Notice: Subject to any disclaimer, the term of this patent is extended or adjusted under 35 U.S.C. 154(b) by 0 days.

This patent is subject to a terminal disclaimer.

(21) Appl. No.: 17/840,580

(22) Filed: Jun. 14, 2022

(65) Prior Publication Data

US 2023/0064392 A1    Mar. 2, 2023

Related U.S. Application Data

(63) Continuation of application No. 16/389,889, filed on Apr. 19, 2019, now Pat. No. 11,367,077, which is a
(Continued)

(51) Int. Cl.
  *G06Q 20/40* (2012.01)
  *G06Q 20/34* (2012.01)
(52) U.S. Cl.
  CPC ....... *G06Q 20/4093* (2013.01); *G06Q 20/341* (2013.01); *G06Q 20/351* (2013.01); *G06Q 20/401* (2013.01)
(58) Field of Classification Search
  CPC ........ G06Q 20/34; G06Q 20/36; G06Q 20/38; G06Q 20/00; G06Q 20/10; G06Q 20/40; G06Q 20/22; G06Q 20/32; G07F 7/10
(Continued)

(56) References Cited

U.S. PATENT DOCUMENTS 5,194,722 A    3/1993  Mergenthaler
5,521,980 A *  5/1996  Brands .................. H04L 9/3257
                                            713/180
(Continued)

FOREIGN PATENT DOCUMENTS

CN    101726284 A    6/2010
EP      1645931 A1    4/2006
(Continued)

OTHER PUBLICATIONS

International Search Report and Written Opinion issued for PCT Application No. PCT/BR2016/050133.
(Continued)

*Primary Examiner* — Olusegun Goyea
(74) *Attorney, Agent, or Firm* — Hanchuk Kheit LLP.; Walter G. Hanchuk

(57) ABSTRACT

The Antifraud Resilient Transaction Identifier Datastructure Apparatuses, Methods and Systems ("ARTID") transforms PIN, unique user identifying device datastructure inputs via ARTID components into secure payment authorization outputs. The ARTID includes a virtual secure element datastructure transaction apparatus, comprising, a memory, a component collection in the memory, and a processor disposed in communication with the memory, and configured to issue a plurality of processing instructions from the component collection stored in the memory. ARTID includes instructions to: obtain request to generate a tamper resistant asset account from a requestor, and instantiate a new tamper resistant asset account, wherein the account is populated with the requestor identifier, unique requestor device identifier, a secure cryptographic element for the tamper resistant account. ARTID also includes instructions to provide a message to generate a new physical account card and an associated virtual account card associated with the tamper resistant asset account, and obtain a request to engage the
(Continued)

ARTID—datagraph online payment authorization

1.Card Validation +
Cardholder Validation +
Card Data Encryption     6.Payment Receipt 2. Cryptogram Generation 3.Payment Transaction 5.Cryptogram Authentication 4.Authorization Request/ Response Issuer                                    Acquirer virtual account card in a transaction, wherein the request includes the user access credential. ARTID also includes instructions to generate a card access event message from the request to engage the virtual account card, provide the card access event message to a payment network, and obtain a card access event authorization response.

22 Claims, 12 Drawing Sheets

Related U.S. Application Data continuation-in-part of application No. 15/178,532, filed on Jun. 9, 2016, now Pat. No. 11,715,109.

(60) Provisional application No. 62/660,841, filed on Apr. 20, 2018, provisional application No. 62/249,919, filed on Nov. 2, 2015, provisional application No. 62/174,449, filed on Jun. 11, 2015.

(58) Field of Classification Search
USPC .... 705/2, 17, 21, 44, 67, 69, 78; 380/28, 30
See application file for complete search history.

(56) References Cited

U.S. PATENT DOCUMENTS

| | | | | |
|---|---|---|---|---|
| 5,604,805 A * | 2/1997 | Brands | .............. | G06Q 20/381 380/28 |
| 5,649,114 A | 7/1997 | Deaton et al. | | |
| 5,668,878 A * | 9/1997 | Brands | .............. | H04L 9/3013 705/41 |
| 6,606,744 B1 | 8/2003 | Mikurak | | |
| 8,429,075 B2 * | 4/2013 | Smith | .............. | G06Q 20/105 705/41 |
| 8,751,316 B1 | 6/2014 | Fletchall et al. | | |
| 2002/0111919 A1 * | 8/2002 | Weller | .............. | G06Q 20/12 705/67 |
| 2003/0200184 A1 * | 10/2003 | Dominguez | ......... | G06Q 20/425 705/78 |
| 2005/0132348 A1 | 6/2005 | Meulemans et al. | | |
| 2008/0270514 A1 | 10/2008 | Soares | | |
| 2010/0088188 A1 * | 4/2010 | Kumar | .............. | G06Q 20/351 705/17 |
| 2010/0131348 A1 | 5/2010 | Greenfield et al. | | |
| 2012/0209749 A1 | 8/2012 | Hammad et al. | | |
| 2012/0239417 A1 * | 9/2012 | Pourfallah | ......... | G06Q 30/0601 705/2 |
| 2013/0030997 A1 * | 1/2013 | Spodak | .............. | G06Q 20/3572 705/41 |
| 2014/0040014 A1 | 2/2014 | Abheek et al. | | |
| 2015/0142657 A1 * | 5/2015 | Sagastiverza | ........ | G06Q 20/351 705/44 |
| 2015/0178693 A1 | 6/2015 | Solis | | |
| 2016/0189135 A1 * | 6/2016 | Hird | .............. | G06Q 20/3274 705/41 |
| 2016/0247141 A1 * | 8/2016 | Graylin | .............. | G06Q 20/3674 |
| 2016/0253657 A1 * | 9/2016 | Sohn | .............. | G06Q 20/40 705/44 |

FOREIGN PATENT DOCUMENTS

| | | |
|---|---|---|
| EP | 2278538 A1 | 1/2016 |
| WO | 2006096824 | 9/2006 |
| WO | 2007011695 | 1/2007 |
| WO | 2012/054786 | 4/2012 |
| WO | 2012156977 | 11/2012 |
| WO | 2013103912 | 7/2013 |
| WO | 2014206046 | 12/2014 |
| WO | 2015015406 | 2/2015 |
| WO | 2015026862 | 2/2015 |

OTHER PUBLICATIONS

European Search Report for Application No. EP20177238.
International search report and Written Opinion for PCT/EP2020/065628 mailed on Aug. 26, 2020.
Office action issued by Argentina patent office for application No. AR104983 A1.
U.S. Appl. No. 15/917,252.
U.S. Appl. No. 15/917,267.
U.S. Appl. No. 15/178,532.
U.S. Appl. No. 16/892,281.
U.S. Appl. No. 16/389,889 (Now U.S. Pat. No. 11,367,077).
U.S. Appl. No. 17/840,580.
U.S. Appl. No. 18/214,497.
U.S. Appl. No. 18/083,506.

* cited by examiner

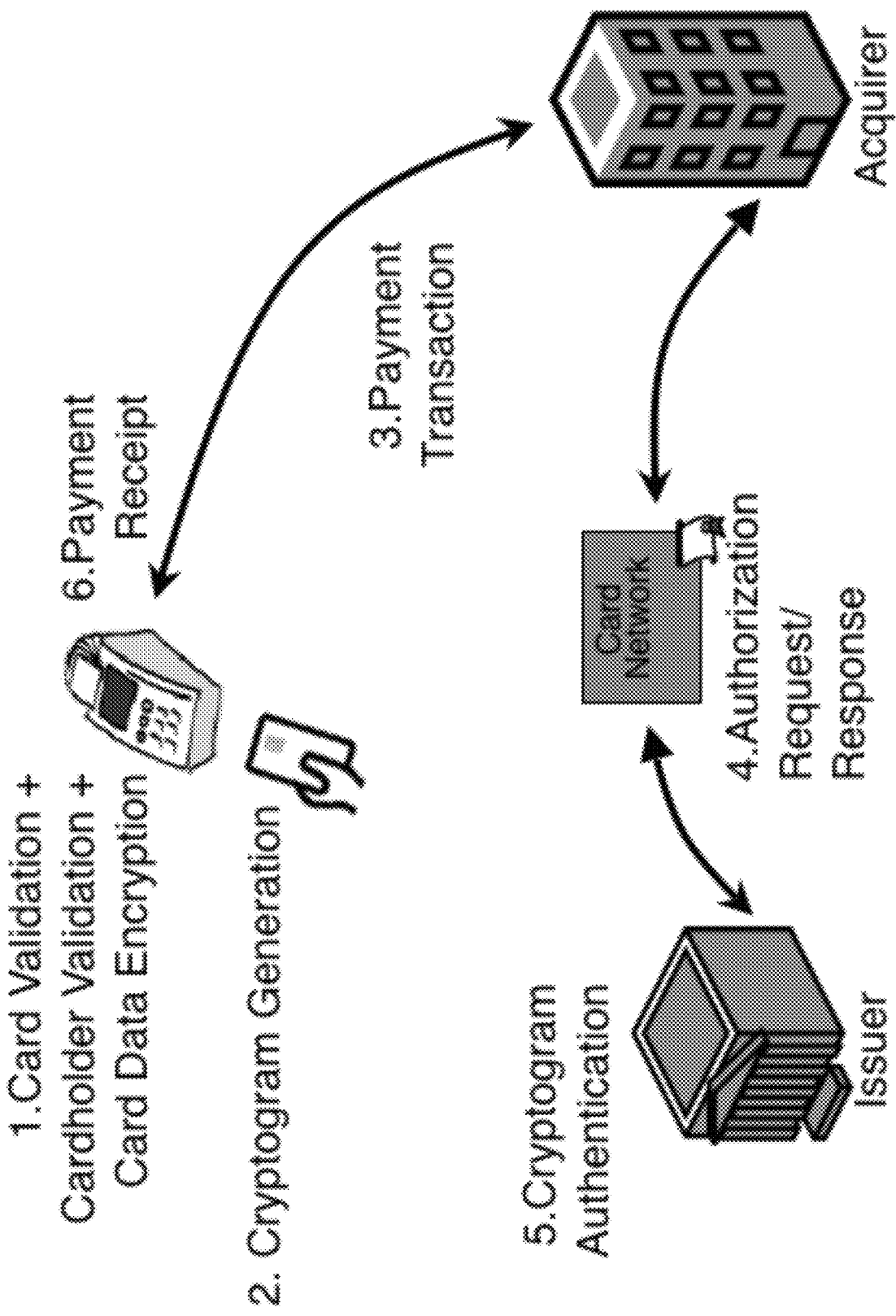
Fig.1: ARTID—datagraph online payment authorization

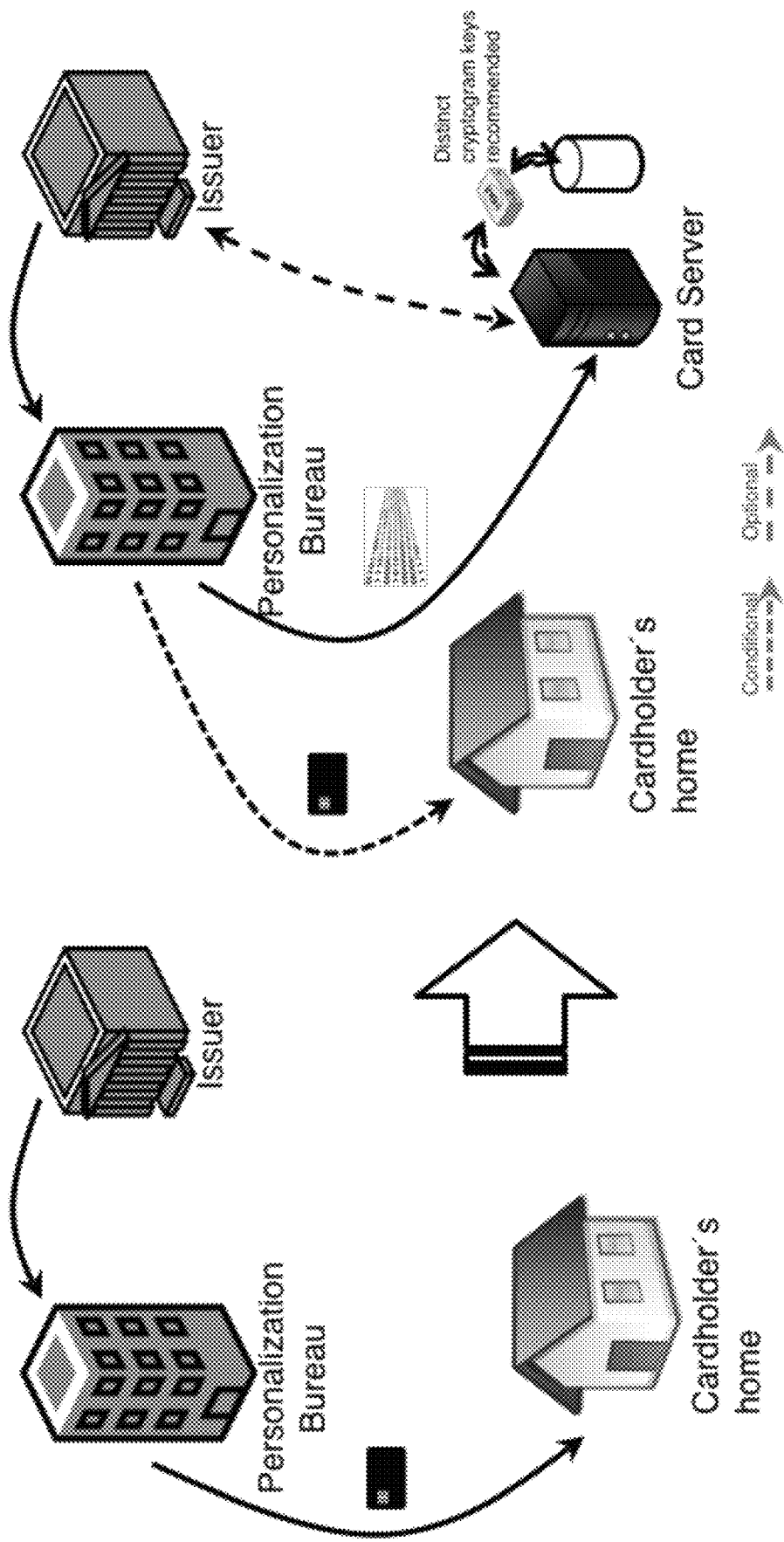

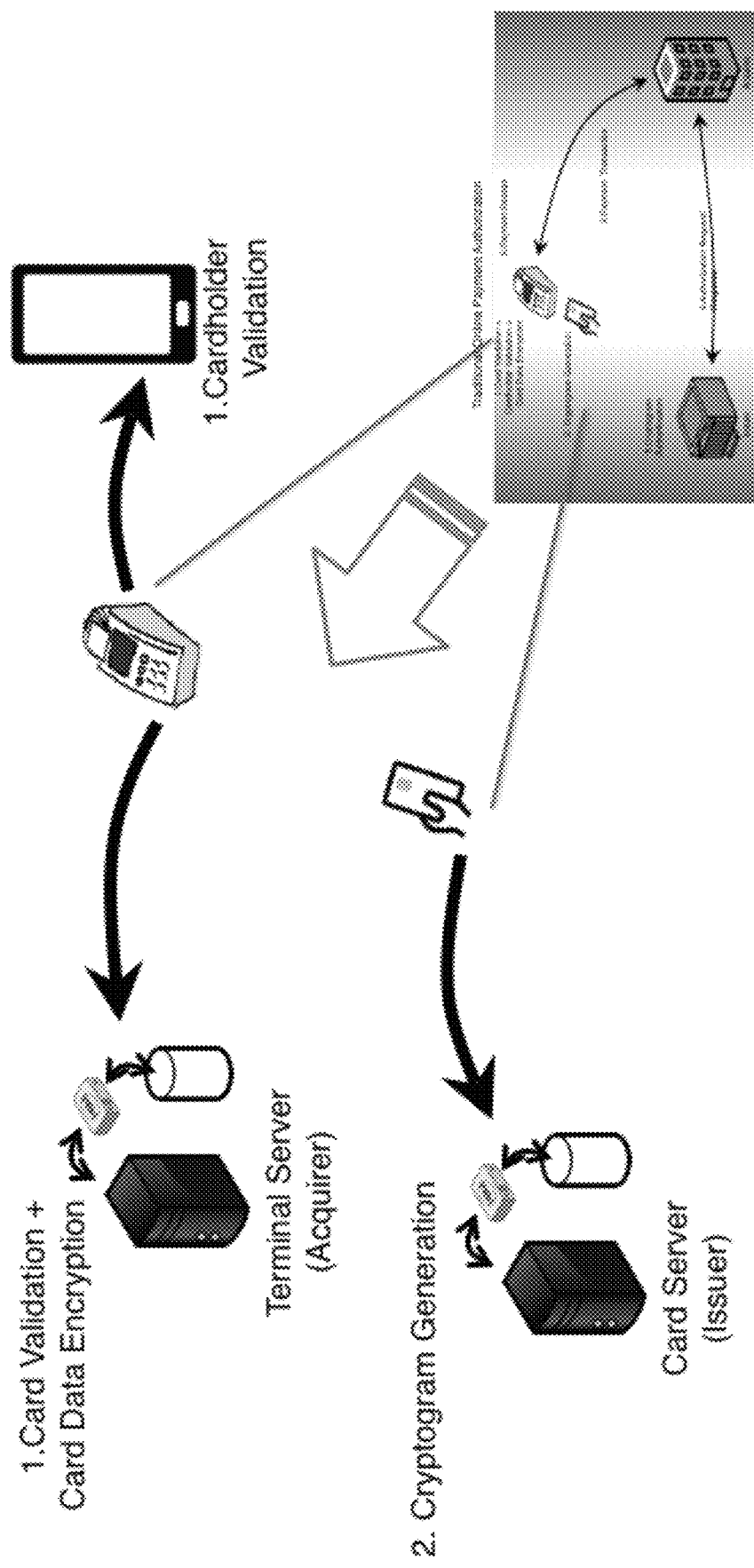
Fig.3: ARTID—datagraph online payment task migration

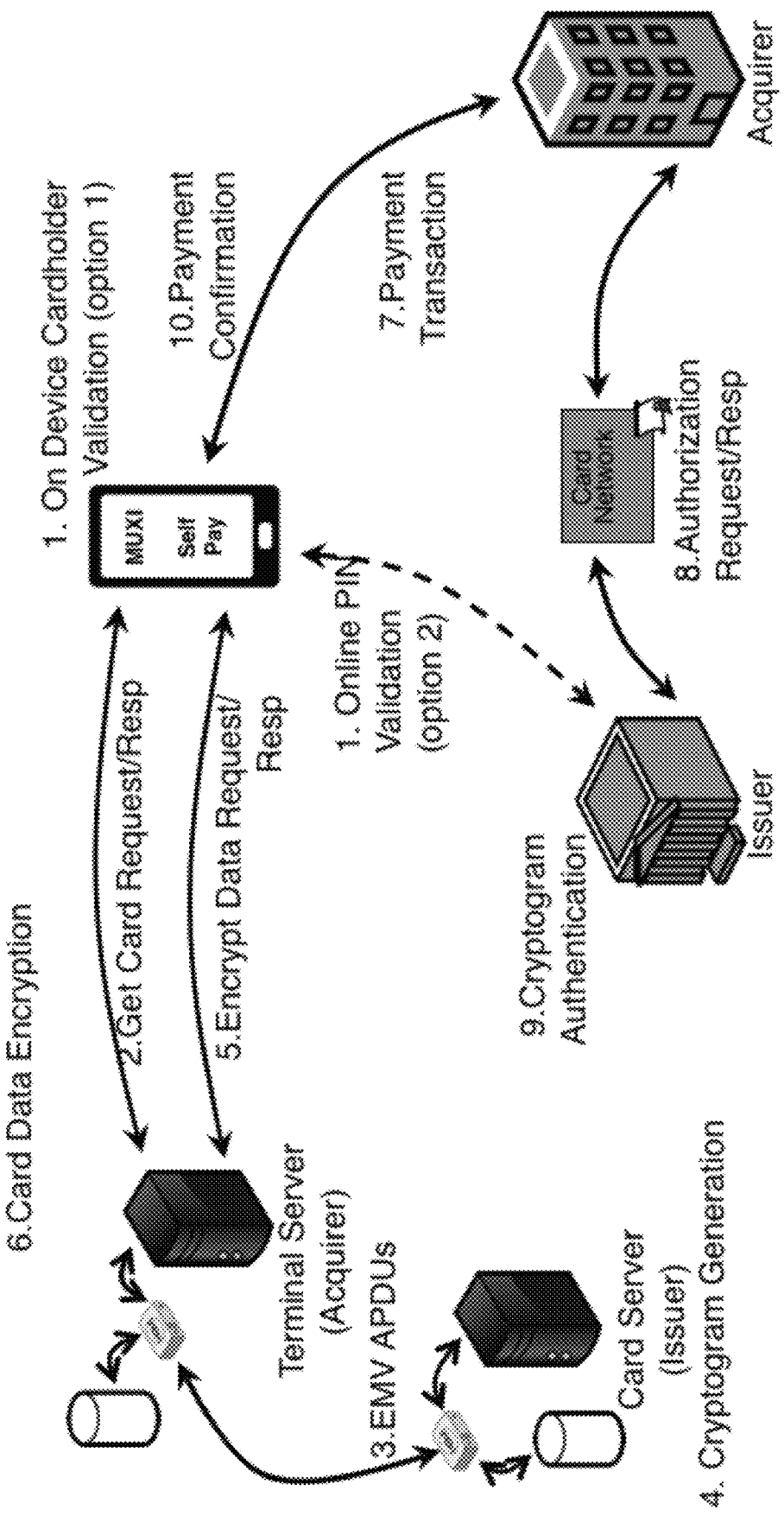
Fig.4: ARTID—datagraph cloud payment authorization mobile client

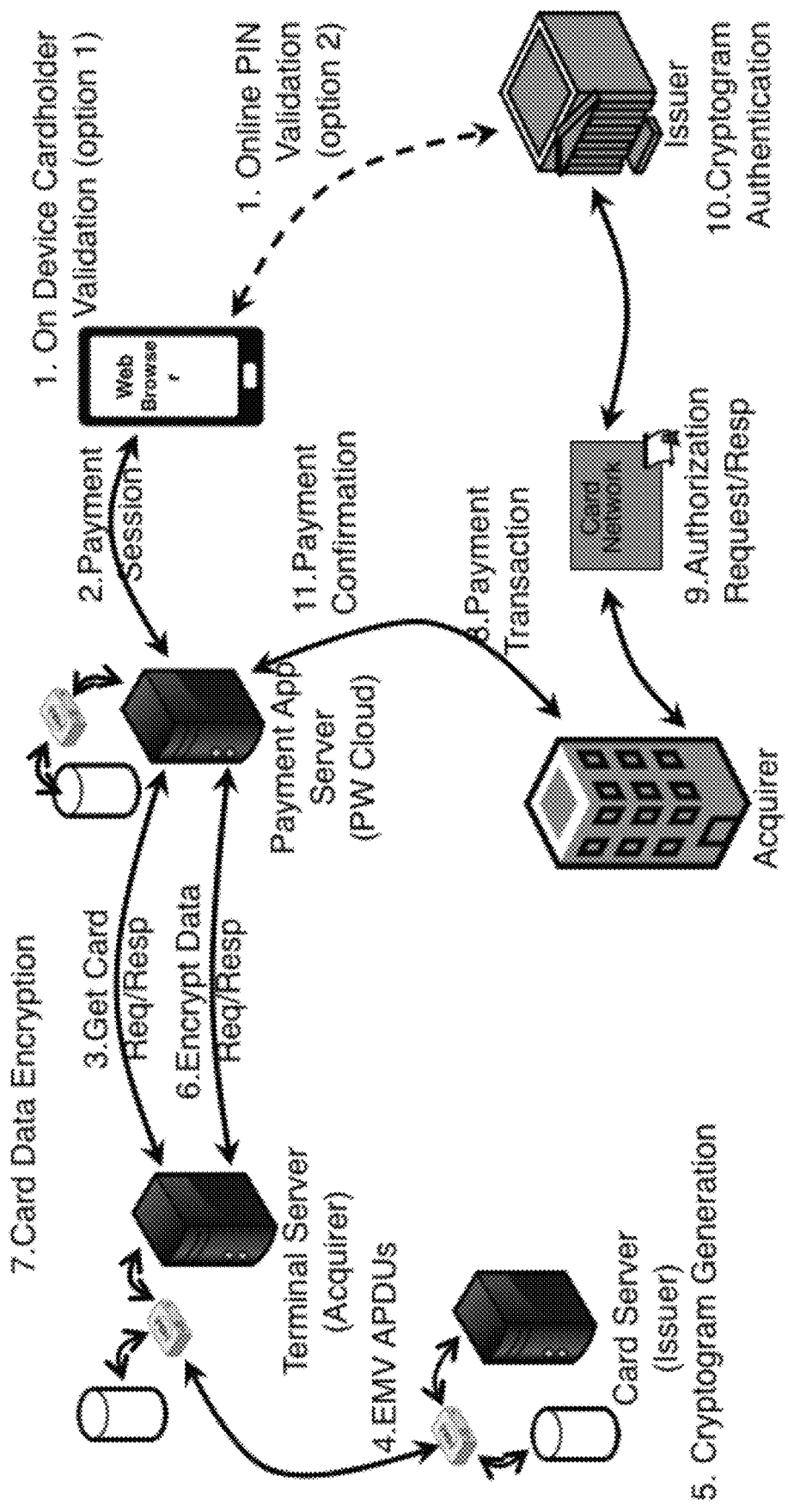
Fig.5: ARTID—datagraph cloud payment authorization mobile web client

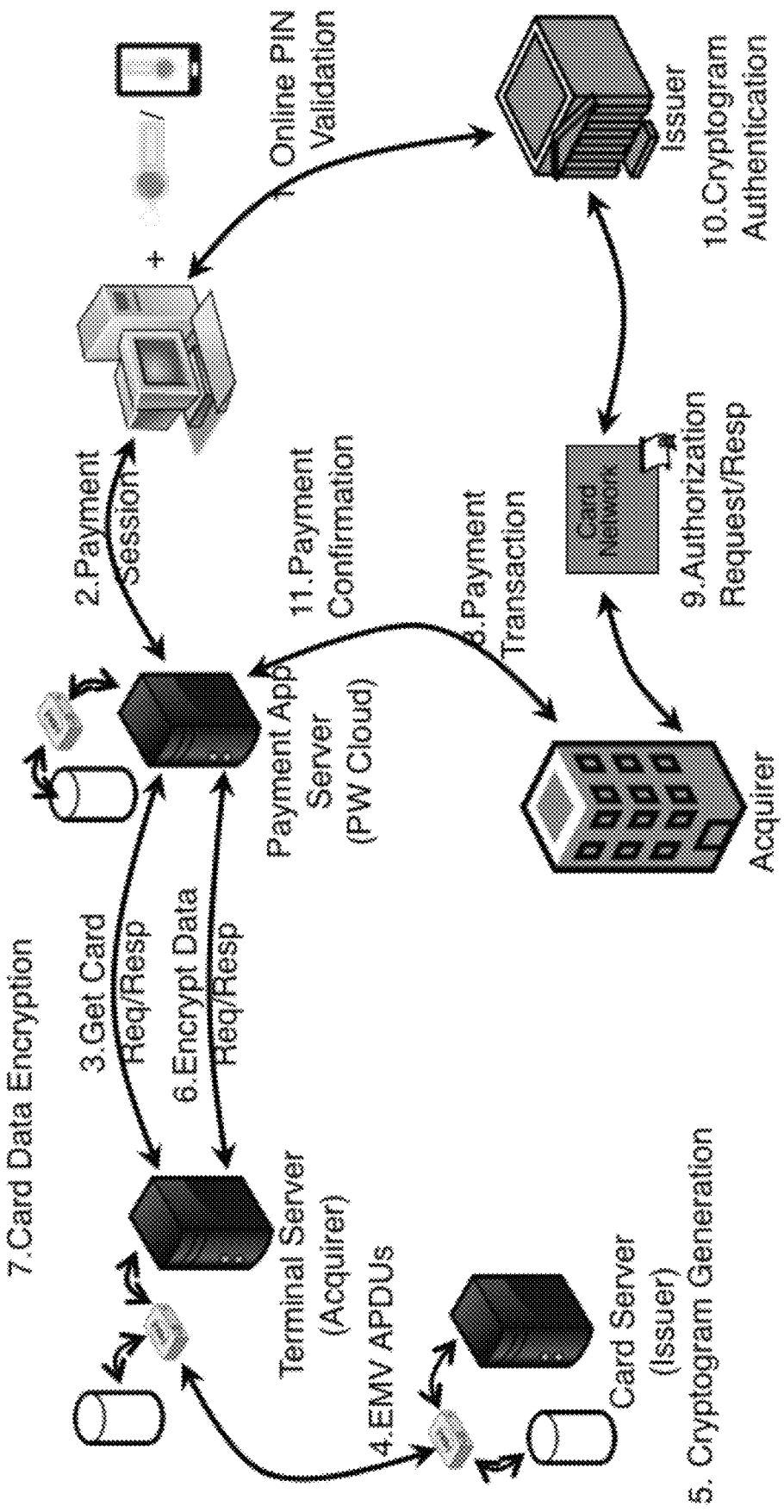
Fig.6: ARTID—datagraph cloud payment authorization web client

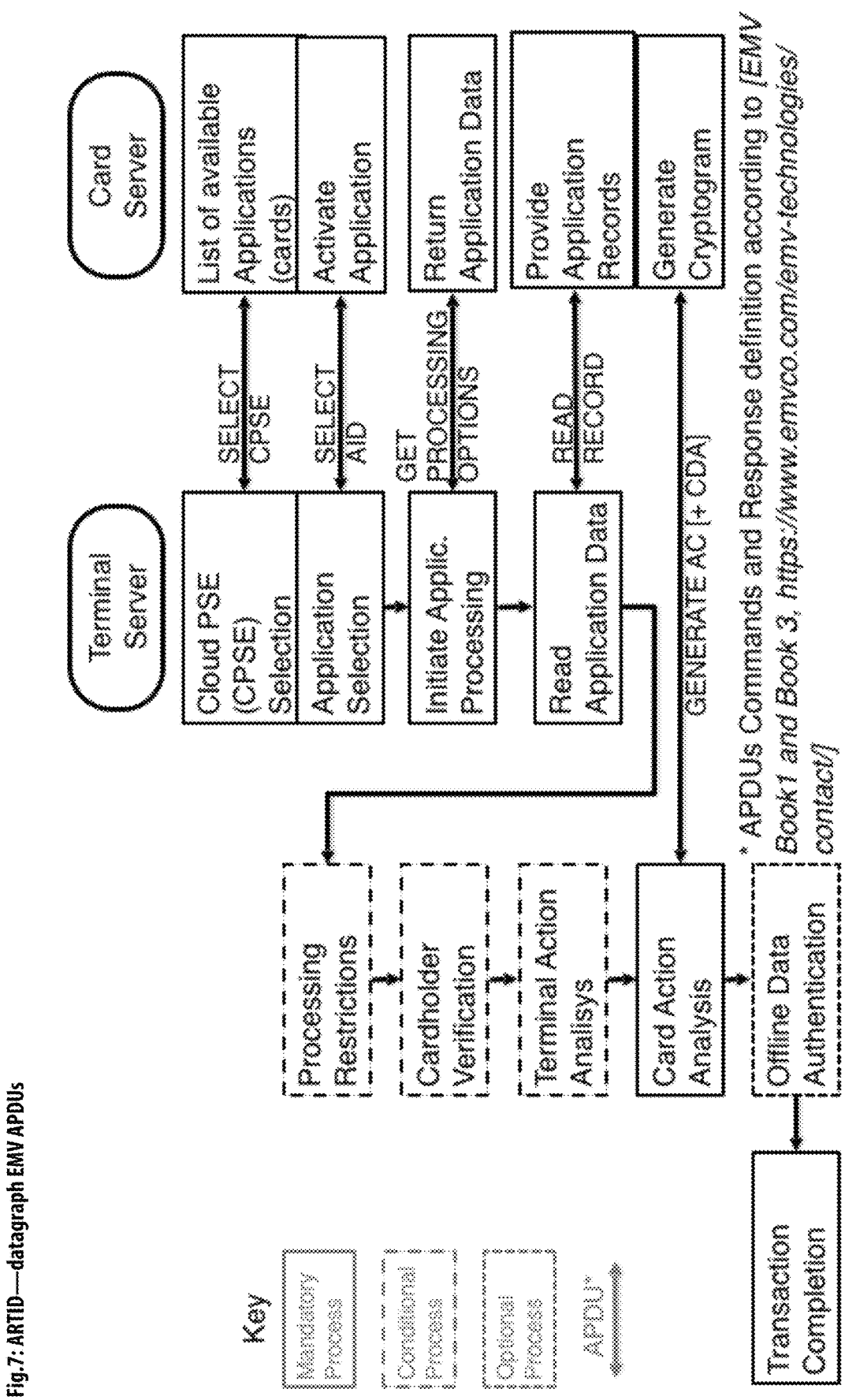
Fig.7: ARTID—datagraph EMV APDUs

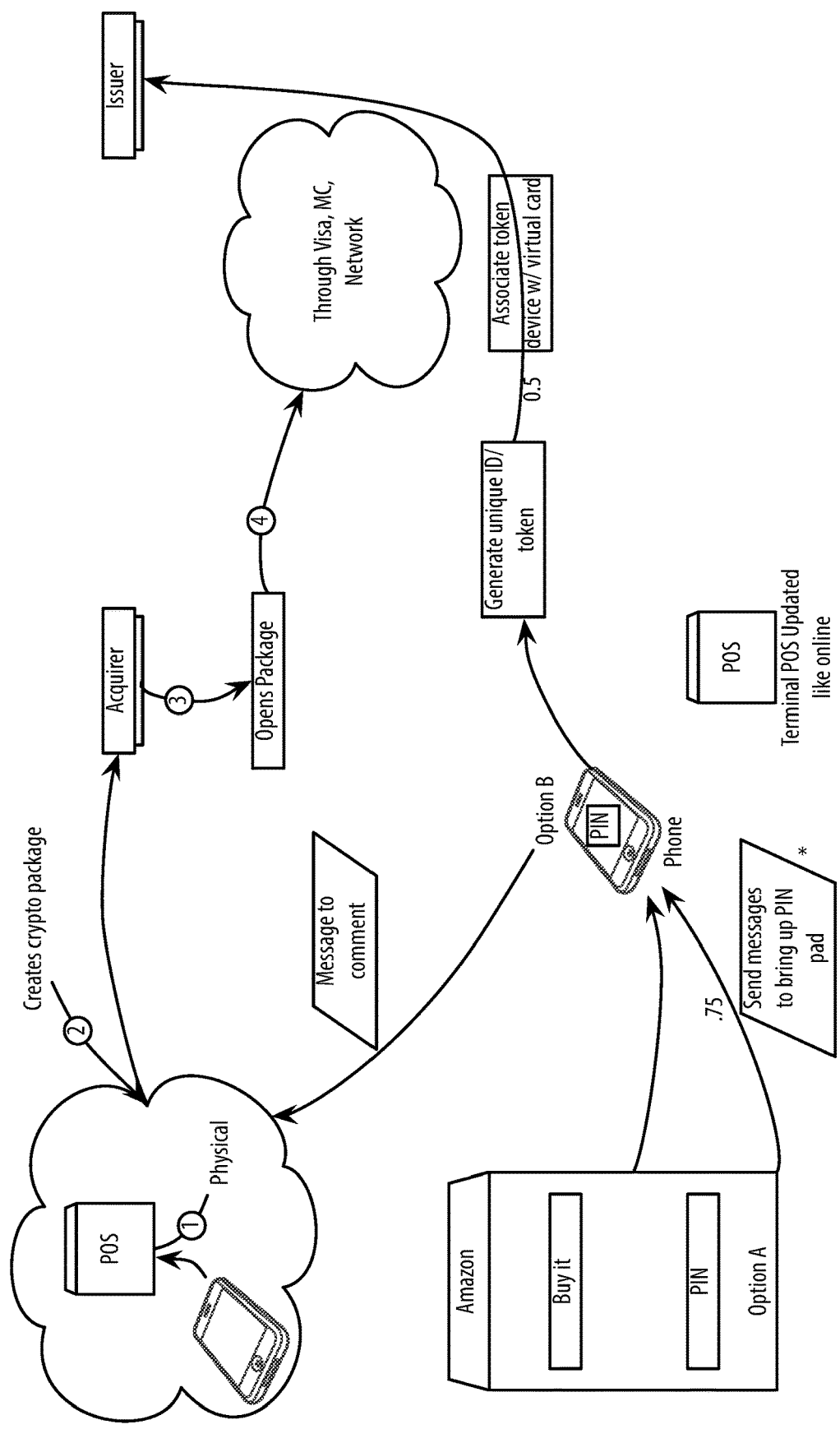

Fig.9: ARTID—datastructures

SELECT command message - CPSE 901

| Code | Value |
|---|---|
| CLA | '00' |
| INS | 'A4' |
| P1 | Reference control parameters (see Table 41) |
| P2 | Selection options (see Table 42) |
| Lc | '05'–'10' |
| Data | File name |
| Le | '00' |

EMV 4.3 Book 1 - 11.3 SELECT Command-Response APDUs 902

SELECT command message - AID 903

| Code | Value |
|---|---|
| CLA | '00' |
| INS | 'A4' |
| P1 | Reference control parameters (see Table 41) |
| P2 | Selection options (see Table 42) |
| Lc | '05'–'10' |
| Data | File name |
| Le | '00' |

EMV 4.3 Book 1 - 11.3 SELECT Command-Response APDUs 902

SELECT command response - CPSE 905

| Tag | Value | | | Presence |
|---|---|---|---|---|
| '6F' | FCI Template | | | M |
| | '84' | DF Name | | M |
| | 'A5' | FCI Proprietary Template | | M |
| | | '88' | SFI of the Directory Elementary File | M |
| | | '5F2D' | Language Preference | O |
| | | '9F11' | Issuer Code Table Index | O |
| | | 'BF0C' | FCI Issuer Discretionary Data | O |
| | | | 'XXXX' (Tag conformant according to Book 3 Annex B) | 1 or more additional proprietary data elements from an application, issuer, or IC card supplier; or EMV-defined tags that are not specifically allocated to 'BF0C' |

SELECT command response - AID 910

| Tag | Value | | | Presence |
|---|---|---|---|---|
| '6F' | FCI Template | | | M |
| | '84' | DF Name | | M |
| | 'A5' | FCI Proprietary Template | | M |
| | | '50' | Application Label | M |
| | | '87' | Application Priority Indicator | O |
| | | '9F38' | PDOL | O |
| | | '5F2D' | Language Preference | O |
| | | '9F11' | Issuer Code Table Index | O |
| | | '9F12' | Application Preferred Name | O |
| | | 'BF0C' | FCI Issuer Discretionary Data | O |
| | | | '9F4D' Log Entry | O |
| | | | 'XXXX' (Tag conformant according to Book 3 Annex B) — 1 or more additional proprietary data elements from an application, issuer, or IC card supplier; or EMV-defined tags that are not specifically allocated to 'BF0C' | O |

Fig.10: ARTID—datastructures

READ RECORD command message 1001

| Code | Value |
|---|---|
| CLA | '00' |
| INS | 'B2' |
| P1 | Record number |
| P2 | Reference control parameter (see Table 39) |
| Lc | Not present |
| Data | Not present |
| Le | '00' |

Table 39: READ RECORD Command Reference Control Parameter

| b8 | b7 | b6 | b5 | b4 | b3 | b2 | b1 | Meaning |
|---|---|---|---|---|---|---|---|---|
| x | x | x | x | x | | | | SFI |
| | | | | | 1 | 0 | 0 | P1 is a record number |

EMV 4.3 Book 1 - 11.2 READ RECORD Command-Response APDUs 1002

Get Processing Options command response 1003

| Tag | Value | | Presence |
|---|---|---|---|
| | Length | Application Interchange Profile | |
| '82' | | Application Interchange Profile | M |
| '94' | | Application File Locator | M |

EMV 4.3 Book 3 - 6.5.8 GET PROCESSING OPTIONS Command-Response APDUs 1004

SELECT command response - AID 1005

| Tag | | | Value | Presence |
|---|---|---|---|---|
| '6F' | FCI Template | | | M |
| | '84' | DF Name | | M |
| | 'A5' | FCI Proprietary Template | | M |
| | | '50' | Application Label | M |
| | | '87' | Application Priority Indicator | O |
| | | '9F38' | PDOL | O |
| | | '5F2D' | Language Preference | O |
| | | '9F11' | Issuer Code Table Index | O |
| | | '9F12' | Application Preferred Name | O |
| | | 'BF0C' | FCI Issuer Discretionary Data | O |
| | | | Long Entry: 1 or more additional proprietary data elements from an application provider, issuer, or EMV defined tags that are not specifically allocated to 'BF0C' | |

Get Processing Options command message 1010

| Code | Value |
|---|---|
| CLA | '80' |
| INS | 'A8' |
| P1 | '00'; all other values are RFU |
| P2 | '00'; all other values are RFU |
| Lc | var. |
| Data | Processing Options Data Object List (PDOL) related data |
| Le | '00' |

EMV 4.3 Book 3 - 6.5.8 GET PROCESSING OPTIONS Command-Response APDUs 1010

Format 1: The data object returned in the response message is a primitive data object with tag equal to '80'. The value field consists of the concatenation without delimiters (tag and length) of the value fields of the AIP and the AFL. 1010

Format 2: The data object returned in the response message is a constructed data object with tag equal to '77'. The value field may contain several BER-TLV coded objects, but shall always include the AIP and the AFL.1010

Fig.11: ARTID—datastructures

GENERATE AC Command 1101

| Code | Value |
|---|---|
| CLA | '80' |
| INS | 'AE' |
| P1 | Reference control parameter (see Table 12) |
| P2 | '00' |
| Lc | Var. |
| Data | Transaction-related data |
| Le | '00' |

Table 12: GENERATE AC Reference Control Parameter

| b8 | b7 | b6 | b5 | b4 | b3 | b2 | b1 | Meaning |
|---|---|---|---|---|---|---|---|---|
| 0 | 0 | | | x | x | x | x | AAC |
| 0 | 1 | | | x | x | x | x | TC |
| 1 | 0 | | | x | x | x | x | ARQC |
| 1 | 1 | | | x | x | x | x | RFU |
| | | 0 | | x | x | x | x | RFU |
| | | 0 | | x | x | x | x | CDA signature not requested |
| | | 1 | | x | x | x | x | CDA signature requested |
| | | | x | x | x | x | x | RFU |

EMV 4.3 Book 3 - 6.5.5 GENERATE APPLICATION CRYPTOGRAM 1102

GENERATE AC Response 1101

Format 1 1105

| Value | Presence |
|---|---|
| Cryptogram Information Data (CID) | M |
| Application Transaction Counter (ATC) | M |
| Application Cryptogram (AC) | M |
| Issuer Application Data (IAD) | O |

Format 2 (CDA):
The data object returned in the response message is a constructed data object with tag equal to '77'. The value field may contain several BER-TLV coded objects, but shall always include the Cryptogram Information Data, the Application Transaction Counter, and the cryptogram computed by the ICC (either an AC or a proprietary cryptogram). 1110

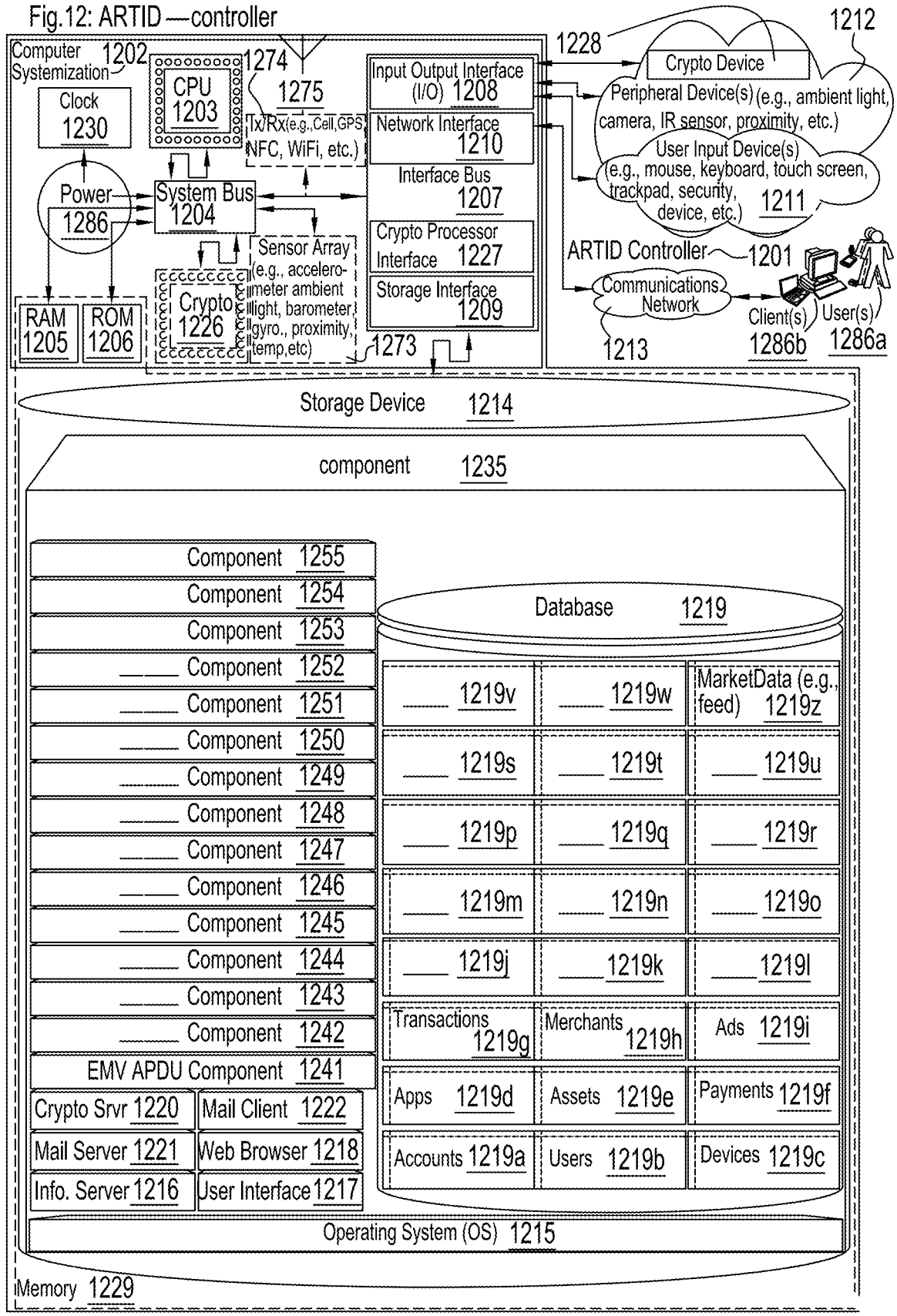

US 12,217,266 B2

ANTIFRAUD RESILIENT TRANSACTION IDENTIFIER DATASTRUCTURE APPARATUSES, METHODS AND SYSTEMS

PRIORITY CLAIM

Applicant hereby claims benefit to priority under 35 USC § 120 as a continuation of U.S. patent application Ser. No. 16/389,889, filed Apr. 19, 2019, entitled "Antifraud Resilient Transaction Identifier Datastructure Apparatuses, Methods and Systems"; and which in turn claims benefit to priority under 35 USC § 119 as a non-provisional conversion of U.S. provisional patent application Ser. No. 62/660,841, filed Apr. 20, 2018, entitled "Antifraud Resilient Transaction Identifier Datastructure Apparatuses, Methods and Systems".

Applicant also hereby claims benefit to priority under 35 USC § 120 as a continuation-in-part of U.S. patent application Ser. No. 15/178,532, filed Jun. 9, 2016, entitled "Point of Sale Apparatuses, Methods and Systems"; and which in turn claims benefit to priority under 35 USC § 119 as a non-provisional conversions of: U.S. provisional patent application Ser. No. 62/174,449, filed Jun. 11, 2015, entitled "Virtualized Point of Sale Terminal Apparatuses, Methods and Systems,"; and U.S. provisional patent application Ser. No. 62/249,919, filed Nov. 2, 2015, entitled "Virtualized Point of Sale Terminal Apparatuses, Methods and Systems,".

The entire contents of the aforementioned applications are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address data security, and more particularly, include Antifraud Resilient Transaction Identifier Datastructure Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Data security systems often use a Personal Identification Number (PIN) to secure data. Various credit card systems include Credit Card Identification Number (CCID) numbers to protect from unauthorized access to credit card accounts. Newer credit cards combine chip and PIN to help prevent unauthorized access to credit cards.

BRIEF DESCRIPTION OF THE DRAWINGS

Appendices and/or drawings illustrating various, non-limiting, example, innovative aspects of the Antifraud Resilient Transaction Identifier Datastructure Apparatuses, Methods and Systems (hereinafter "ARTID") disclosure, include:

FIG. 1 shows a datagraph illustrating data flow(s) for the ARTID;
FIG. 2 shows a datagraph illustrating data flow(s) for the ARTID;
FIG. 3 shows a datagraph illustrating data flow(s) for the ARTID;
FIG. 4 shows a datagraph illustrating data flow(s) for the ARTID;
FIG. 5 shows a datagraph illustrating data flow(s) for the ARTID;
FIG. 6 shows a datagraph illustrating data flow(s) for the ARTID;
FIG. 7 shows a datagraph illustrating data flow(s) for the ARTID;
FIG. 8 shows a datagraph illustrating data flow(s) for the ARTID;
FIG. 9 shows a data structure for the ARTID;
FIG. 10 shows a data structure for the ARTID;
FIG. 11 shows a data structure for the ARTID.
FIG. 12 shows a block diagram illustrating embodiments of a ARTID controller;
APPENDIX 1 illustrate embodiments of the ARTID.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Antifraud Resilient Transaction Identifier Datastructure Apparatuses, Methods and Systems (hereinafter "ARTID") transforms PIN, unique user identifying device datastructure inputs, via ARTID components (e.g., EMV APDU, etc. components), into secure payment authorization outputs. The ARTID components, in various embodiments, implement advantageous features as set forth below.

Introduction

The ARTID provides unconventional features (e.g., a virtual secure element datastructure transaction apparatus having a: request to generate a tamper resistant asset account from a requestor, instantiation of a new tamper resistant asset account, generation of an account card associated with the tamper resistant asset account, generation of a card access event message from the request to engage the account card) that were never before available in data security.

In one embodiment, the ARTID places card encrypted data having a secure element into a certified hardware security module (HSM). In one embodiment, the ARTID clones a physical card infrastructure (e.g., including a PIN pad and Europay, Mastercard and Visa (EMV) card, etc.) into a network accessible infrastructure. The HSM is configured to emulate a chip and pin pad and have access to a virtual card that is the same as a physical credit card. The HSM houses this emulated secure element and pin pad and is disposed in communication with, an acquirer terminal, a payment network, an issuer. The ARTID provides a PIN, unique user identifying device datastructure it generates from a combination of user data and user device unique identifying information such as (UUID, etc.).

ARTID

Example Datastructure Commands

The ARTID may include various datastructures:
Get card request format:

| Position | Format | Description |
|---|---|---|
| 001-002 | N2 | Identifier of the Acquiring Network, according to the Parameter × AID Table. To cover all networks, you must use the value "00". |
| 003-004 | N2 | Type of application desired, according to Parameter × AID Table. For any application, use "99". For a list of specific applications, use "00". |
| 005-016 | N12 | Initial transaction value in cents (Amount, authorized), can be 0 (zero) if this data is not available at the beginning of the transaction. |
| 017-022 | N6 | Date of transaction ("AAMMDD") |
| 023-028 | N6 | Transaction Time ("HHMMSS") |
| 029-038 | N10 | "Time-stamp "of the parameter tables, formed by day, month, year and a sequential number (" DDMMAAAASS ") - see Chapter 4. If an Acquirer Network is defined, this "time-stamp" refers only to the tables related to it. |
| 039-040 | N2 | Number of entries in the following list, if desired application type is "00" IMPORTANT: This field is not optional, and should receive the value "00" if there is no list below. |
| 041-??? | N4 | Network identifier + index for Parameter × AID Table. |
| ... | ... | ... |
| ???-??? | N4 | Network identifier + index for Parameter × AID Table. |
| ???-??? | N3 | Size in bytes of the following tag list ("000" to "yyy"). |
| ???-??? | Hxxx(Byyy) | List of tags (**) for field 55 of the ISO8583 message field. |

Get card response format:

| Position | Format | Description |
|---|---|---|
| 001-002 | N2 | Type of card read: "00" - Magnetic, "01" - VISA Cash Coin Makers on TIBC v1, "02" - VISA Cash Coin Makers on TIBC v3, "03" - EMV with contact, "04" - Easy-Entry on TIBC v1, "05" - Contactless chip simulating stripe, "06" - Non-contact EMV |
| 003 | N1 | Status of last chip card reading. "0" - Successful (or other status that does not involve fallback). In this case the magnetic card with indication of the presence of chip should not be accented. "2" - Required application not supported. |
| 004-005 | N2 | Type of application selected, according to Parameter × AID Table (position 043-044). |
| 006-007 | N2 | Identifier of the acquiring network, according to Parameter × AID Table (position 005-006). |
| 008-009 | N2 | Register Index of Parameter × AID Table (position 007-008). |
| 010-011 | N2 | Track 1 Size |
| 012-087 | A76 | Track 1 (without sentries and formatting byte - first alphanumeric character), left-aligned with spaces to the right |
| 088-089 | N2 | Track 2 Size |
| 090-126 | A37 | Track 2 (without sentries), left-aligned with spaces to the right |
| 127-129 | N3 | Track size 3 |
| 130-233 | A104 | Track 3 (without sentries), left-aligned with spaces to the right |
| 234-235 | N2 | PAN size |
| 236-254 | A19 | PAN, left-aligned with spaces to the right |
| 255-256 | N2 | Application PAN Sequence Number |
| 257-272 | A16 | Application Label, with spaces to the right. |
| 273-275 | N3 | Service Code |
| 276-301 | A26 | Cardholder Name, with spaces to the right |
| 302-307 | N6 | Application Expiration Date (YYMMDD) |
| 308-309 | N2 | Size of the card's external number. |
| 310-328 | A19 | External number of the card, left-aligned with spaces to the right |
| 329-336 | N8 | Balance, for coin case. |
| 337-339 | N3 | Issuer Country Code |
| 340-342 | N3 | the following data size, in characters |
| 343-??? | A??? | List of tags for field 55 of the ISO8583 message field. |

Encrypt data request format:

| Position | Format | Description |
|---|---|---|
| 001 | N1 | Encryption Mode: "0" - Master Key/Working DES (8 bytes) "1" - Master Key/Working 3DES (16 bytes) "2" - DUKPT DES "3" - DUKPT Triple-DES |
| 002-003 | N2 | Master Key Index or DUKPT Treatment Record |
| 004-035 | H32(B16) | Working Key (encrypted by Master Key), and in "0" mode, only the first 8 bytes are used. Data to be encrypted. |

-continued

| Position | Format | Description |
|---|---|---|
| 036-037 | N2 | Clear data size, in bytes |
| 038-??? | Hxx(Byy) | Clear data. |

Encrypt data response format, DUKPT case:

| Position | Format | Description |
|---|---|---|
| 001-020 | H20 (B10) | Serial Number of Key (Key Serial Number) and Counter (Key Counter). |
| 021-022 | N2 | Encrypted data size, in bytes (equal to input size) |
| 023-??? | Hxx(Byy) | Encrypted data. |

Encrypt data response format, master key case

| Position | Format | Description |
|---|---|---|
| 001-002 | N2 | Encrypted data size, in bytes (equal to input size) |
| 003-??? | Hxx(Byy) | Encrypted data. |

FIG. 1 shows a datagraph illustrating data flow(s) for the ARTID.

FIG. 2 shows a datagraph illustrating data flow(s) for the ARTID.

FIG. 3 shows a datagraph illustrating data flow(s) for the ARTID.

FIG. 4 shows a datagraph illustrating data flow(s) for the ARTID.

FIG. 5 shows a datagraph illustrating data flow(s) for the ARTID.

FIG. 6 shows a datagraph illustrating data flow(s) for the ARTID.

FIG. 7 shows a datagraph illustrating data flow(s) for the ARTID.

FIG. 8 shows a datagraph illustrating data flow(s) for the ARTID.

FIG. 9 shows a data structure for the ARTID.

FIG. 10 shows a data structure for the ARTID.

FIG. 11 shows a data structure for the ARTID.

ARTID Controller

FIG. 12 shows a block diagram illustrating embodiments of a ARTID controller. In this embodiment, the ARTID controller 1201 may serve to aggregate, process, store, search, serve, identify, instruct, generate, match, and/or facilitate interactions with a computer through data security technologies, and/or other related data.

Users, which may be people and/or other systems, may engage information technology systems (e.g., computers) to facilitate information processing. In turn, computers employ processors to process information; such processors 1203 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 1229 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the ARTID controller 1201 may be connected to and/or communicate with entities such as, but not limited to: one or more users from peripheral devices 1212 (e.g., user input devices 1211); an optional cryptographic processor device 1228; and/or a communications network 1213.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The ARTID controller 1201 may be based on computer systems that may comprise, but are not limited to, components such as: a computer systemization 1202 connected to memory 1229.

Computer Systemization

A computer systemization 1202 may comprise a clock 1230, central processing unit ("CPU(s)" and/or "processor(s)" (these terms are used interchangeable throughout the disclosure unless noted to the contrary)) 1203, a memory 1229 (e.g., a read only memory (ROM) 1206, a random access memory (RAM) 1205, etc.), and/or an interface bus 1207, and most frequently, although not necessarily, are all interconnected and/or communicating through a system bus 1204 on one or more (mother)board(s) 1202 having conductive and/or otherwise transportive circuit pathways through which instructions (e.g., binary encoded signals) may travel to effectuate communications, operations, storage, etc. The computer systemization may be connected to a power source 1286; e.g., optionally the power source may be internal. Optionally, a cryptographic processor 1226 may be connected to the system bus. In another embodiment, the cryptographic processor, transceivers (e.g., ICs) 1274, and/or sensor array (e.g., accelerometer, altimeter, ambient light, barometer, global positioning system (GPS) (thereby allowing ARTID controller to determine its location), gyroscope, magnetometer, pedometer, proximity, ultra-violet sensor, etc.) 1273 may be connected as either internal and/or external peripheral devices 1212 via the interface bus I/O 1208 (not pictured) and/or directly via the interface bus 1207. In turn, the transceivers may be connected to antenna(s) 1275, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11 g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n, Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1229 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's DragonBall® and PowerPC®; IBM's® and Sony's® Cell processor; Intel's® 80×86 series (e.g., 80386, 80486), Pentium®, Celeron®, Core (2) Duo®, i series (e.g., i3, i5, i7, etc.), Itanium®, Xeon®, and/or XScale®; Motorola's® 680×0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to various data processing techniques. Such instruction passing facilitates communication within the ARTID controller and beyond through various interfaces. Should processing requirements dictate a greater amount speed and/or capacity, distributed processors (e.g., see Distributed ARTID below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the ARTID may be achieved by implementing a microcontroller such as CAST's® R8051XC2 microcontroller; Intel's® MCS 51 (i.e., 8051 microcontroller); and/or the like. Also, to implement certain features of the ARTID, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the ARTID component collection (distributed or otherwise) and/or features may be implemented via the microprocessor and/or via embedded components; e.g., via ASIC, coprocessor, DSP, FPGA, and/or the like. Alternately, some implementations of the ARTID may be implemented with embedded components that are configured and used to achieve a variety of features or signal processing.

Depending on the particular implementation, the embedded components may include software solutions, hardware solutions, and/or some combination of both hardware/software solutions. For example, ARTID features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the ARTID features. A hierarchy of programmable interconnects allow logic blocks to be interconnected as needed by the ARTID system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the ARTID may be developed on FPGAs and then migrated into a fixed version that more resembles ASIC implementations. Alternate or coordinating implementations may migrate ARTID controller features to a final ASIC instead of or in addition to FPGAs. Depending on the implementation all of the aforementioned embedded components and microprocessors may be considered the "CPU" and/or "processor" for the ARTID.

Power Source

The power source 1286 may be of any various form for powering small electronic circuit board devices such as the following power cells alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1286 is connected to at least one of the interconnected subsequent components of the ARTID thereby providing an electric current to all subsequent components. In one example, the power source 1286 is connected to the system bus component 1204. In an alternative embodiment, an outside power source 1286 is provided through a connection across the I/O 1208 interface. For example, a USB and/or IEEE 1394 connection carries both data and power across the connection and is therefore a suitable source of power.

Interface Adapters

Interface bus(ses) 1207 may accept, connect, and/or communicate to a number of interface adapters, variously although not necessarily in the form of adapter cards, such as but not limited to: input output interfaces (I/O) 1208, storage interfaces 1209, network interfaces 1210, and/or the like. Optionally, cryptographic processor interfaces 1227 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1209 may accept, communicate, and/or connect to a number of storage devices such as, but not limited to: storage devices 1214, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1210 may accept, communicate, and/or connect to a communications network 1213. Through a communications network 1213, the ARTID controller is accessible through remote clients 1233b (e.g., computers with web browsers) by users 1233a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed ARTID below), architectures may similarly be employed to pool, load balance, and/or otherwise decrease/increase the communicative bandwidth required by the ARTID controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 1210 may be used to engage with various communications network types 1213. For example, multiple network interfaces may be employed to allow for the communication over broadcast, multicast, and/or unicast networks.

Input Output interfaces (I/O) 1208 may accept, communicate, and/or connect to user, peripheral devices 1212 (e.g., input devices 1211), cryptographic processor devices 1228, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 1212 may be connected and/or communicate to I/O and/or other facilities of the like such as network interfaces, storage interfaces, directly to the interface bus, system bus, the CPU, and/or the like. Peripheral devices may be external, internal and/or part of the ARTID controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 1211 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the ARTID controller may be embodied as an embedded, dedicated, and/or monitor-less (i.e., headless) device, wherein access would be provided over a network interface connection.

Cryptographic units such as, but not limited to, microcontrollers, processors 1226, interfaces 1227, and/or devices 1228 may be attached, and/or communicate with the ARTID controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® CryptoNetX and other Security Processors; nCipher's® nShield; SafeNef's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+ MB/s of cryptographic instructions; VLSI Technology's® 33 MHz 6868; and/or the like.

Memory

Generally, any mechanization and/or embodiment allowing a processor to affect the storage and/or retrieval of information is regarded as memory 1229. However, memory is a fungible technology and resource, thus, any number of memory embodiments may be employed in lieu of or in concert with one another. It is to be understood that the ARTID controller and/or a computer systemization may employ various forms of memory 1229. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 1229 will include ROM 1206, RAM 1205, and a storage device 1214. A storage device 1214 may be any various computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 1229 may contain a collection of program and/or database components and/or data such as, but not limited to: operating system component(s) 1215 (operating system); information server component(s) 1216 (information server); user interface component(s) 1217 (user interface); Web browser component(s) 1218 (Web browser); database(s) 1219; mail server component(s) 1221; mail client component(s) 1222; cryptographic server component(s) 1220 (cryptographic server); the ARTID component(s) 1235; and/or the like (i.e., collectively a component collection). These components may be stored and accessed from the storage devices and/or from storage devices accessible through an interface bus. Although unconventional program components such as those in the component collection may be stored in a local storage device 1214, they may also be loaded and/or stored in memory such as: peripheral devices, RAM, remote storage facilities through a communications network, ROM, various forms of memory, and/or the like.

Operating System

The operating system component 1215 is an executable program component facilitating the operation of the ARTID controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millenium/Mobile/NT/Vista/XP (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the ARTID controller to communicate with other entities through a communications network 1213. Various communication protocols may be used by the ARTID controller as a subcarrier transport mechanism for interaction, such as, but not limited to: multicast, TCP/IP, UDP, unicast, and/or the like.

Information Server

An information server component 1216 is a stored program component that is executed by a CPU. The information server may be a an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects®, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the ARTID controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the ARTID database 1219, operating systems, other program components, user interfaces, Web browsers, and/or the like.

Access to the ARTID database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the ARTID. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, wherein the resulting command is provided over the bridge mechanism to the ARTID as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, menus, scrollers, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other web-browser/cloud based client OSs); Microsoft's Windows® varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface®, any of which may be used and) provide a baseline and means of accessing and displaying information graphically to users.

A user interface component 1217 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1218 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the ARTID enabled nodes. The combined application may be nugatory on systems employing Web browsers.

Mail Server

A mail server component 1221 is a stored program component that is executed by a CPU 1203. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POPS), simple mail transfer protocol (SMTP), and/or the like. The mail server can route, forward, and process incoming and outgoing mail messages that have been sent, relayed and/or otherwise traversing through and/or to the ARTID. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the ARTID mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1222 is a stored program component that is executed by a CPU 1203. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1220 is a stored program component that is executed by a CPU 1203, cryptographic processor 1226, cryptographic processor interface 1227, cryptographic processor device 1228, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the ARTID may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to allow the ARTID component to engage in secure transactions if so desired. The cryptographic component facilitates the secure accessing of resources on the ARTID and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The ARTID Database

The ARTID database component 1219 may be embodied in a database and its stored data. The database is a stored program component, which is executed by the CPU; the stored program component portion configuring the CPU to process the stored data. The database may be a fault tolerant, relational, scalable, secure database such as MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the ARTID database may be implemented using various other data-structures, such as an array, hash, (linked) list, struct, structured text file (e.g., XML), table, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the ARTID database is implemented as a data-structure, the use of the ARTID database 1219 may be integrated into another component such as the ARTID component 1235. Also, the database may be implemented as a mix of data structures, objects, and relational structures. Databases may be consolidated and/or distributed in countless variations (e.g., see Distributed ARTID below). Portions of databases, e.g., tables, may be exported and/or imported and thus decentralized and/or integrated.

In one embodiment, the database component 1219 includes several tables 1219*a-z*:

An accounts table 1219*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 1219*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a ARTID);

An devices table 1219*c* includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 1219*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 1219*e* includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 1219f includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 1219g includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 1219h includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 1219i includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

A market_data table 1219z includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe®, Consolidated Quote System® (CQS), Consolidated Tape Association® (CTA), Consolidated Tape System® (CTS), Dun & Bradstreet®, OTC Montage Data Feed® (OMDF), Reuter's Tib®, Triarch®, US equity trade and quote market data®, Unlisted Trading Privileges® (UTP) Trade Data Feed® (UTDF), UTP Quotation Data Feed® (UQDF), and/or the like feeds, e.g., via ITC 2.1 and/or respective feed protocols), for example, through Microsoft's® Active Template Library and Dealing Object Technology's real-time toolkit Rtt.Multi.

In one embodiment, the ARTID database may interact with other database systems. For example, employing a distributed database system, queries and data access by search ARTID component may treat the combination of the ARTID database, an integrated data security layer database as a single database entity (e.g., see Distributed ARTID below).

In one embodiment, user programs may contain various user interface primitives, which may serve to update the ARTID. Also, various accounts may require custom database tables depending upon the environments and the types of clients the ARTID may need to serve. It should be noted that any unique fields may be designated as a key field throughout. In an alternative embodiment, these tables have been decentralized into their own databases and their respective database controllers (i.e., individual database controllers for each of the above tables). Employing various data processing techniques, one may further distribute the databases over several computer systemizations and/or storage devices. Similarly, configurations of the decentralized database controllers may be varied by consolidating and/or distributing the various database components 1219a-z. The ARTID may be configured to keep track of various settings, inputs, and parameters via database controllers.

The ARTID database may communicate to and/or with other components in a component collection, including itself, and/or facilities of the like. Most frequently, the ARTID database communicates with the ARTID component, other program components, and/or the like. The database may contain, retain, and provide information regarding other nodes and data.

The ARTIDs

The ARTID component 1235 is a stored program component that is executed by a CPU. In one embodiment, the ARTID component incorporates any and/or all combinations of the aspects of the ARTID that was discussed in the previous figures. As such, the ARTID affects accessing, obtaining and the provision of information, services, transactions, and/or the like across various communications networks. The features and embodiments of the ARTID discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the ARTID's features and facilities, and in many cases reduce the costs, energy consumption/requirements, and extend the life of ARTID's underlying infrastructure; this has the added benefit of making the ARTID more reliable. Similarly, many of the features and mechanisms are designed to be easier for users to use and access, thereby broadening the audience that may enjoy/employ and exploit the feature sets of the ARTID; such ease of use also helps to increase the reliability of the ARTID. In addition, the feature sets include heightened security as noted via the Cryptographic components 1220, 1226, 1228 and throughout, making access to the features and data more reliable and secure The ARTID transforms PIN, unique user identifying device datastructure inputs, via ARTID components (e.g., EMV APDU), into secure payment authorization outputs.

The ARTID component enabling access of information between nodes may be developed by employing various development tools and languages such as, but not limited to: Apache® components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the ARTID server employs a cryptographic server to encrypt and decrypt communications. The ARTID component may communicate to and/or with other components in a component collection, including itself, and/or facilities of the like. Most frequently, the ARTID component communicates with the ARTID database, operating systems, other program components, and/or the like. The ARTID may contain, communicate, generate, obtain, and/or provide program component, system, user, and/or data communications, requests, and/or responses.

Distributed ARTIDs

The structure and/or operation of any of the ARTID node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through various data processing communication techniques.

The configuration of the ARTID controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for ARTID controller and/or ARTID component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like.

Again, the desired configuration will depend upon the context, environment, and requirements of system deployment.

For example, in some implementations, the ARTID controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT
database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for Antifraud Resilient Transaction Identifier Datastructure Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivative thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a ARTID individual and/or enterprise user, database configuration and/or relational model, data type, data transmission and/or network framework, syntax structure, and/or the like, various embodiments of the ARTID, may be implemented that allow a great deal of flexibility and customization. For example, aspects of the ARTID may be adapted for credential security. While various embodiments and discussions of the ARTID have included data security, however, it is to be understood that the embodiments described herein may be readily configured and/or customized for a wide variety of other applications and/or implementations.

What is claimed is:

1. A virtual secure element datastructure transaction apparatus, comprising:
    a memory;
    a component collection in the memory;
    a processor disposed in communication with the memory, and configured to issue a plurality of processing instructions from the component collection stored in the memory, to:
        obtain request to generate a tamper resistant asset account from a requestor,
            in which the request includes an antifraud resilient transaction identifier datastructure, including a requestor identifier and a unique requestor device identifier,
            in which the requestor identifier includes any of: requestor name, requestor address, account identifier, requestor,
            in which the unique requestor device identifier includes any of: UUID, cryptographic signature of the device, cryptographic hashes of any of: the unique requestor device identifier and the requestor identifier;
        instantiate a new tamper resistant asset account, in which the account is populated with the requestor identifier, unique requestor device identifier, a secure cryptographic element for the tamper resistant account,
        provide a message to generate an account card associated with the tamper resistant asset account;
        obtain a request to engage the account card in a transaction;
        generate a card access event message from the request to engage the account card, in which the card access event message is an equivalent of a card present chip engagement to a user access credential;
        provide the card access event message to a payment network;
        obtain a card access event authorization response.

2. The apparatus of claim 1, in which the account card is a physical account card.

3. The apparatus of claim 1, in which the account card is a virtual account card.

4. The apparatus of claim 1, in which the account card is a new physical account card and an associated virtual account card associated with the tamper resistant asset account.

5. The apparatus of claim 4, in which the message is configured to generate the virtual account card to be a clone of the physical account card.

6. The apparatus of claim 5, in which the physical account card and virtual account card have the same account number, a same secure cryptographic element.

7. The apparatus of claim 1, in which the card access event message is configured to be delivered to an issuer of the physical account card.

8. The apparatus of claim 1, further, comprising:
    obtaining a secure element update request;
    providing a message to generate a new secure cryptographic element and update the same secure cryptographic element.

9. The apparatus of claim 1, in which the message is triggered periodically, and in which a period may be any of: seconds, minutes, hours, days, weeks, months, years, dynamically, on-demand, real-time.

10. A processor-readable virtual secure element datastructure transaction non-transient medium storing processor-executable components, the components, comprising:
    a component collection stored in the medium, including processor executable instructions to:
        obtain request to generate a tamper resistant asset account from a requestor,
            in which the request includes an antifraud resilient transaction identifier datastructure, including a requestor identifier and a unique requestor device identifier,
            in which the requestor identifier includes any of: requestor name, requestor address, account identifier, requestor, phone number, social security number,
            in which the unique requestor device identifier includes any of: UUID, storage device unique identifier, unique operating system identifiers, cryptographic signature of the device, cryptographic hashes of any of: the unique requestor device identifier and the requestor identifier;
        instantiate a new tamper resistant asset account, in which the account is populated with the requestor identifier, unique requestor device identifier, a secure cryptographic element for the tamper resistant account,
        provide a message to generate an account card associated with the tamper resistant asset account, in which the account card is configured to authorize account access to a user access credential,
        obtain a request to engage the account card in a transaction;
        generate a card access event message from the request to engage the account card, in which the card access event message is an equivalent of a card present chip engagement to a user access credential;
        provide the card access event message to a payment network;
        obtain a card access event authorization response.

11. The non-transient medium of claim 10, in which the account card is a new physical account card and an associated virtual account card associated with the tamper resistant asset account.

12. The apparatus of claim 4, in which the message is configured to generate the virtual account card to be a clone of the physical account card.

13. A processor-implemented virtual secure element datastructure transaction system, comprising:
  means to obtain request to generate a tamper resistant asset account from a requestor,
    in which the request includes an antifraud resilient transaction identifier datastructure, including a requestor identifier and a unique requestor device identifier,
      in which the requestor identifier includes any of: requestor name, requestor address, account identifier, requestor, phone number, social security number,
      in which the unique requestor device identifier includes any of: UUID, storage device unique identifier, unique operating system identifiers, cryptographic signature of the device, cryptographic hashes of any of: the unique requestor device identifier and the requestor identifier;
  means to instantiate a new tamper resistant asset account, in which the account is populated with the requestor identifier, unique requestor device identifier, a secure cryptographic element for the tamper resistant account,
  means to provide a message to generate an account card associated with the tamper resistant asset account,
    in which the account card is configured to authorize account access to a user access credential, means to obtain a request to engage the account card in a transaction;
  means to generate a card access event message from the request to engage the account card, in which the card access event message is an equivalent of a card present chip engagement to a user access credential;
  means to provide the card access event message to a payment network;
  means to obtain a card access event authorization response.

14. The system of claim 13, in which the account card is a new physical account card and an associated virtual account card associated with the tamper resistant asset account.

15. The system of claim 13, in which the message is configured to generate the virtual account card to be a clone of the physical account card.

16. A processor-implemented virtual secure element datastructure transaction method, comprising:
  executing processor-implemented component collection instructions to:
    obtain request to generate a tamper resistant asset account from a requestor,
      in which the request includes an antifraud resilient transaction identifier datastructure, including a requestor identifier and a unique requestor device identifier,
        in which the requestor identifier includes any of: requestor name, requestor address, account identifier, requestor, phone number, social security number,
        in which the unique requestor device identifier includes any of: UUID, storage device unique identifier, unique operating system identifiers, cryptographic signature of the device, cryptographic hashes of any of: the unique requestor device identifier and the requestor identifier;
    instantiate a new tamper resistant asset account, in which the account is populated with the requestor identifier, unique requestor device identifier, a secure cryptographic element for the tamper resistant account,
    provide a message to generate an account card associated with the tamper resistant asset account, in which the account card is configured to authorize account access to a user access credential,
    obtain a request to engage the account card in a transaction;
    generate a card access event message from the request to engage the account card, in which the card access event message is an equivalent of a card present chip engagement to a user access credential;
    provide the card access event message to a payment network;
    obtain a card access event authorization response.

17. The system of claim 13, in which the account card is a new physical account card and an associated virtual account card associated with the tamper resistant asset account.

18. The apparatus of claim 4, in which the message is configured to generate the virtual account card to be a clone of the physical account card.

19. A virtual secure element datastructure transaction apparatus, comprising:
  a memory;
  a component collection in the memory;
  a processor disposed in communication with the memory, and configured to issue a plurality of processing instructions from the component collection stored in the memory, to:
    obtain request to generate a tamper resistant asset account from a requestor,
      in which the request includes an antifraud resilient transaction identifier datastructure, including a requestor identifier and a unique requestor device identifier,
        in which the requestor identifier includes any of: requestor name, requestor address, account identifier, requestor, phone number, social security number,
        in which the unique requestor device identifier includes any of: UUID, storage device unique identifier, unique operating system identifiers, cryptographic signature of the device, cryptographic hashes of any of: the unique requestor device identifier and the requestor identifier;
    instantiate a new tamper resistant asset account, in which the account is populated with the requestor identifier, unique requestor device identifier, a secure cryptographic element for the tamper resistant account,
    provide a message to generate a new physical account card and an associated virtual account card associated with the tamper resistant asset account,
      in which the message is configured to generate the virtual account card to be a clone of the physical account card,
      in which the physical account card and virtual account card have the same account number, a same secure cryptographic element,
      in which the physical account card and the virtual account card are configured to authorize account access to a same user access credential;

obtain a request to engage the virtual account card in a transaction;
generate a card access event message from the request to engage the virtual account card, in which the card access event message is an equivalent of a card present chip engagement to a user access credential;
provide the card access event message to a payment network;
obtain a card access event authorization response.

20. The apparatus of claim 19, in which the card access event message is configured to be delivered to an issuer of the physical account card.

21. The apparatus of claim 19, further, comprising:
obtaining a secure element update request;
providing a message to generate a new secure cryptographic element and update the same secure cryptographic element.

22. The apparatus of claim 19, in which the message is triggered periodically, and in which a period may be any of: seconds, minutes, hours, days, weeks, months, years, dynamically, on-demand, real-time.

\* \* \* \* \*